US007617991B2

(12) United States Patent
Wells et al.

(10) Patent No.: US 7,617,991 B2
(45) Date of Patent: Nov. 17, 2009

(54) INJECTOR FUEL FILTER WITH BUILT-IN ORIFICE FOR FLOW RESTRICTION

(75) Inventors: Allan R. Wells, Rochester, NY (US); Kevin R. Keegan, Hilton, NY (US)

(73) Assignee: Delphi Technologies, Inc., Troy, MI (US)

( * ) Notice: Subject to any disclaimer, the term of this patent is extended or adjusted under 35 U.S.C. 154(b) by 95 days.

(21) Appl. No.: 11/395,671

(22) Filed: Mar. 31, 2006

(65) Prior Publication Data

US 2007/0227984 A1 Oct. 4, 2007

(51) Int. Cl.
*B01D 35/02* (2006.01)
*B01D 21/28* (2006.01)
*F02D 1/06* (2006.01)

(52) U.S. Cl. .................. 239/5; 239/575; 239/DIG. 23; 210/767; 210/137; 210/251; 210/416.4; 210/448; 210/450; 210/474; 210/477; 210/429; 137/544

(58) Field of Classification Search ...................... None
See application file for complete search history.

(56) References Cited

U.S. PATENT DOCUMENTS 834,431 A * 10/1906 Williams .................... 210/448
1,797,280 A * 3/1931 Zerk .......................... 137/843
2,375,646 A * 5/1945 Grossi ......................... 138/41
2,457,578 A * 12/1948 Maliphant .................... 138/41
2,645,099 A * 7/1953 Cumming .................... 62/511
3,109,459 A * 11/1963 Lee, II ......................... 138/40
3,642,031 A * 2/1972 Wright ......................... 138/45
3,715,870 A * 2/1973 Guzick ......................... 55/466
3,983,903 A * 10/1976 Kuehn, Jr. .................... 138/40
4,009,592 A * 3/1977 Boerger ....................... 62/222
4,130,622 A * 12/1978 Pawlak ....................... 264/255
4,171,209 A * 10/1979 Brown ......................... 55/466
4,266,576 A * 5/1981 Bradford ..................... 138/40
4,324,112 A * 4/1982 Fujiwara et al. ............... 62/511
4,426,213 A * 1/1984 Stavropoulos ............... 55/466
4,526,593 A * 7/1985 Meyerson .................. 55/385.1
4,608,166 A * 8/1986 Cain .......................... 210/232
4,830,057 A * 5/1989 Hendrickson ................ 138/45
4,874,017 A * 10/1989 Hendrickson ................ 138/45
4,895,178 A * 1/1990 McHugh ................. 134/167 C
4,946,107 A * 8/1990 Hunt ....................... 239/585.4
4,957,123 A * 9/1990 McHugh ................. 134/167 C
4,971,117 A * 11/1990 Hendrickson ................ 138/41
5,137,624 A * 8/1992 Klotz ......................... 210/171
5,139,685 A * 8/1992 de Castro et al. ............ 210/767
5,340,032 A * 8/1994 Stegmaier et al. ........... 239/575
D363,760 S * 10/1995 Morem et al. .............. D23/209
5,499,968 A * 3/1996 Milijasevic et al. ........... 604/30

(Continued)

FOREIGN PATENT DOCUMENTS

GB 2225383 A * 5/1990

(Continued)

*Primary Examiner*—Robert James Popovics
(74) *Attorney, Agent, or Firm*—Paul L. Marshall

(57) ABSTRACT

Apparatus and method for substantially reducing or eliminating pressure pulsations caused by the opening and closing of fuel injectors. A preferred embodiment provides a restriction orifice adjacent the inlet end of a fuel injector filter of a respective fuel injector.

14 Claims, 1 Drawing Sheet

U.S. PATENT DOCUMENTS

| | | | | | |
|---|---|---|---|---|---|
| 5,511,585 | A | * | 4/1996 | Lee, II | 138/44 |
| 5,516,424 | A | * | 5/1996 | Strohschein | 210/232 |
| 5,533,478 | A | * | 7/1996 | Robinson | 123/510 |
| 5,588,635 | A | * | 12/1996 | Hartman | 251/127 |
| 5,641,126 | A | * | 6/1997 | Nally et al. | 239/575 |
| 5,707,012 | A | * | 1/1998 | Maier et al. | 239/575 |
| 5,755,386 | A | * | 5/1998 | Lavan et al. | 239/585.4 |
| 5,766,469 | A | * | 6/1998 | Boast et al. | 210/335 |
| 5,772,123 | A | * | 6/1998 | Augustin et al. | 239/533.2 |
| D410,274 | S | * | 5/1999 | Bradshaw | D23/209 |
| 5,906,225 | A | * | 5/1999 | Stark et al. | 138/41 |
| 5,915,626 | A | * | 6/1999 | Awarzamani et al. | 239/135 |
| 5,921,475 | A | * | 7/1999 | DeVriese et al. | 239/585.4 |
| 5,927,613 | A | * | 7/1999 | Koyanagi et al. | 239/585.1 |
| 5,935,434 | A | * | 8/1999 | Cates | 210/232 |
| 5,944,262 | A | * | 8/1999 | Akutagawa et al. | 239/585.4 |
| 5,967,424 | A | * | 10/1999 | Bonnah, II | 239/575 |
| 5,975,436 | A | * | 11/1999 | Reiter et al. | 239/585.1 |
| 5,979,866 | A | * | 11/1999 | Baxter et al. | 251/129.21 |
| 5,996,227 | A | * | 12/1999 | Reiter et al. | 29/888.45 |
| 5,996,910 | A | * | 12/1999 | Takeda et al. | 239/585.1 |
| 5,996,911 | A | * | 12/1999 | Gesk et al. | 239/585.1 |
| 6,000,433 | A | * | 12/1999 | Carroll et al. | 138/41 |
| 6,003,790 | A | * | 12/1999 | Fly | 239/533.9 |
| 6,012,655 | A | * | 1/2000 | Maier | 239/585.4 |
| 6,019,128 | A | * | 2/2000 | Reiter | 137/549 |
| 6,027,049 | A | * | 2/2000 | Stier | 239/585.1 |
| 6,039,271 | A | * | 3/2000 | Reiter | 239/585.4 |
| 6,076,802 | A | * | 6/2000 | Maier | 251/129.21 |
| 6,089,467 | A | * | 7/2000 | Fochtman et al. | 239/5 |
| 6,135,094 | A | * | 10/2000 | Okada et al. | 123/470 |
| 6,173,915 | B1 | * | 1/2001 | Cohen et al. | 239/585.1 |
| 6,186,421 | B1 | * | 2/2001 | Wahba et al. | 239/585.1 |
| 6,186,472 | B1 | * | 2/2001 | Reiter | 251/129.21 |
| 6,199,775 | B1 | * | 3/2001 | Dallmeyer | 239/575 |
| 6,201,461 | B1 | * | 3/2001 | Eichendorf et al. | 335/256 |
| 6,264,112 | B1 | * | 7/2001 | Landschoot et al. | 239/5 |
| 6,328,232 | B1 | * | 12/2001 | Haltiner et al. | 239/585.1 |
| 6,338,796 | B1 | * | 1/2002 | Bradford | 210/196 |
| 6,698,664 | B2 | * | 3/2004 | Dallmeyer et al. | 239/5 |
| 6,811,092 | B2 | * | 11/2004 | Cowden | 239/89 |
| 7,041,217 | B1 | * | 5/2006 | Close et al. | 210/232 |
| 7,343,740 | B2 | * | 3/2008 | Sakai et al. | 60/453 |
| 2002/0062817 | A1 | * | 5/2002 | Endo | 123/467 |
| 2002/0162537 | A1 | * | 11/2002 | Smith et al. | 123/446 |
| 2003/0052052 | A1 | * | 3/2003 | Boast et al. | 210/429 |
| 2003/0131826 | A1 | * | 7/2003 | Smith et al. | 123/446 |
| 2004/0084028 | A1 | * | 5/2004 | Zdroik | 123/456 |
| 2007/0095745 | A1 | * | 5/2007 | Sebastian | 210/439 |
| 2007/0221175 | A1 | * | 9/2007 | Boecking | 123/459 |
| 2007/0227984 | A1 | * | 10/2007 | Wells et al. | 210/767 |
| 2009/0055084 | A1 | * | 2/2009 | Ishizuka et al. | 701/105 |
| 2009/0063010 | A1 | * | 3/2009 | Nakata et al. | 701/103 |
| 2009/0107225 | A1 | * | 4/2009 | Ishizuka et al. | 73/114.15 |
| 2009/0107227 | A1 | * | 4/2009 | Ishizuka et al. | 73/114.74 |
| 2009/0112444 | A1 | * | 4/2009 | Ishizuka et al. | 701/105 |
| 2009/0112447 | A1 | * | 4/2009 | Ishizuka et al. | 701/109 |
| 2009/0120869 | A1 | * | 5/2009 | Harkema et al. | 210/498 |
| 2009/0121049 | A1 | * | 5/2009 | Flynn et al. | 239/575 |

FOREIGN PATENT DOCUMENTS

| | | | | |
|---|---|---|---|---|
| GB | 2294502 | A | * | 5/1996 |
| JP | 2001234833 | A | * | 8/2001 |
| JP | 2007127116 | A | * | 5/2007 |
| WO | WO 2006049598 | A1 | * | 5/2006 |

* cited by examiner

INJECTOR FUEL FILTER WITH BUILT-IN ORIFICE FOR FLOW RESTRICTION

TECHNICAL FIELD

The present invention relates to fuel injectors for internal combustion engines; more particularly, to a fuel injector with a built-in orifice for reducing pressure pulsations.

BACKGROUND OF THE INVENTION

Fuel injectors for controllably metering fuel to the combustion cylinders of internal combustion engines are well known. For ease and reliability in manufacturing, the fuel injectors typically are mounted by their inlet ends at appropriate intervals into a rigid fuel supply line harness, appropriately configured to place the injection end of each fuel injector into its corresponding injection socket in the manifold runner. Such a harness is known as a fuel injector rail, or simply a fuel rail.

In a typical direct injector fuel injection system, each injector is programmed to pulse or open every other revolution of the engine crankshaft. During an injector opening event in a direct injector fuel injection system, the measured fuel pressure in the fuel rail can instantaneously drop by more than 30 kPa, then can increase by more than 50 kPa after the injector closes. Although such high and low pressures can vary widely depending on rail volume, injector open/close time, and inlet line inner diameter, for example, in a typical four cylinder engine operating at 2000 RPM, the combined injectors can pulse at a rate of 66 pulses per second. In such injector-based systems, these pulses cause high frequency pressure waves of significant amplitude to propagate through the fuel rail(s) potentially causing erratic delivery of fuel to the cylinders.

The fuel rails themselves are typically bolted to the cylinder head. In one prior art design, the fuel rail is laterally offset from the position of the bolts which are secured to the cylinder head through brackets. The fuel rail is offset so the bolts are accessible when attaching or removing the fuel rail from the cylinder head. In this design, the brackets extend around a respective fuel injector socket, into which the inlet ends of the injectors are placed. This prior art design requires a jump tube leading from the rail to the respective injector socket.

One known method for reducing injector pressure pulsations is to include a restriction orifice in the fuel line leading to the injector. Due to the narrowing of the flow area, the restriction orifice breaks up and thus reduces the pressure pulsations. The location of the restriction orifice should be somewhere between the fuel rail and injector. In one known design, the restriction orifice is placed inside the jump tube. While this method is effective at reducing pressure pulsations, it also adds cost and complexity to the fuel system.

It would therefore be desirable to have a design and method for reducing pressure pulsations in a fuel line that does not increase cost or complexity to the system.

SUMMARY OF THE INVENTION

The present invention addresses the above need by providing a design and method for reducing pressure pulsations in a fuel line caused by the opening and closing of the fuel injectors. In a preferred embodiment, a restriction orifice is provided in the fuel injector filter of a respective fuel injector. The restriction orifice acts to break up and thus reduce or eliminate pressure pulsations through the fuel injector.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
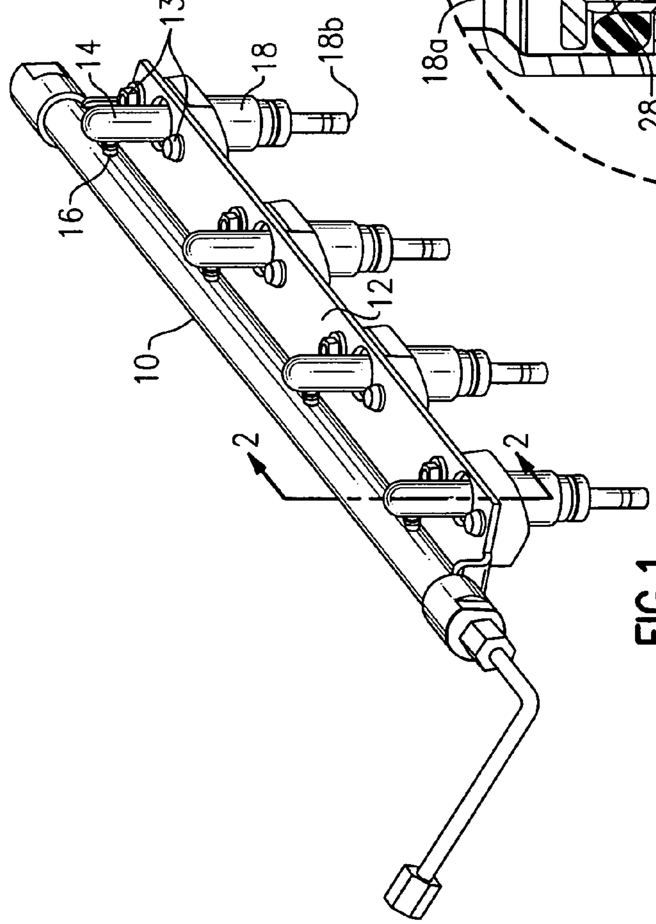
FIG. 1 is an isometric view of a fuel rail and associated fuel injectors.

Referring to FIG. 1, there is seen a fuel rail 10 for mounting to an engine (not shown) via bracket 12. The fuel rail 10 is laterally offset from the injector sockets 14 to provide access to the bolts 13 which pass through openings in bracket 12. With the fuel rail 10 laterally offset from the injector sockets 14, jump tubes 16 are required to provide a fluid path from the rail 10 to a respective injector socket 14. Injector sockets 14 are known in the art and provide a coupling between a respective fuel injector 18 and the fuel rail 10.

It is noted that fuel rail 10 and bracket 12 are shown for purposes of environment only, and the present invention may be used in any fuel delivery system having one or more fuel injectors.

Fuel injectors 18 each have a fuel inlet end 18*a* and fuel outlet end 18*b*. Fuel is thus directed through fuel outlet end 18*b* upon the opening of the injector. As stated above, fuel injectors open and close very rapidly in order to provide the correct amount of fuel to the engine depending on the engine load condition. Without corrective measures being taken, unacceptable amounts of noise and vibration are created due to the rapid opening and closing of the fuel injectors as they pass fuel into the engine.

Figure 2:
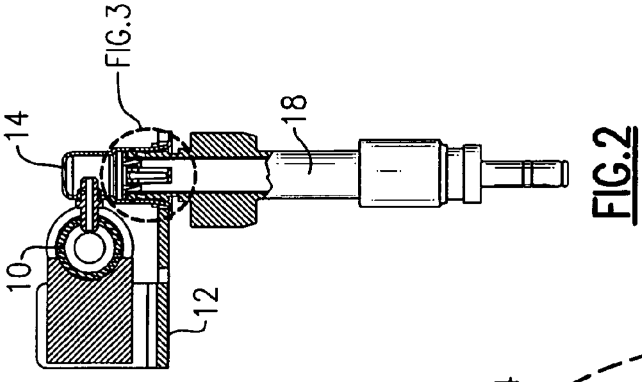
FIG. 2 is a partial cross-sectional view of a fuel injector as taken generally along the line 2-2 in FIG. 1.
Figure 3:
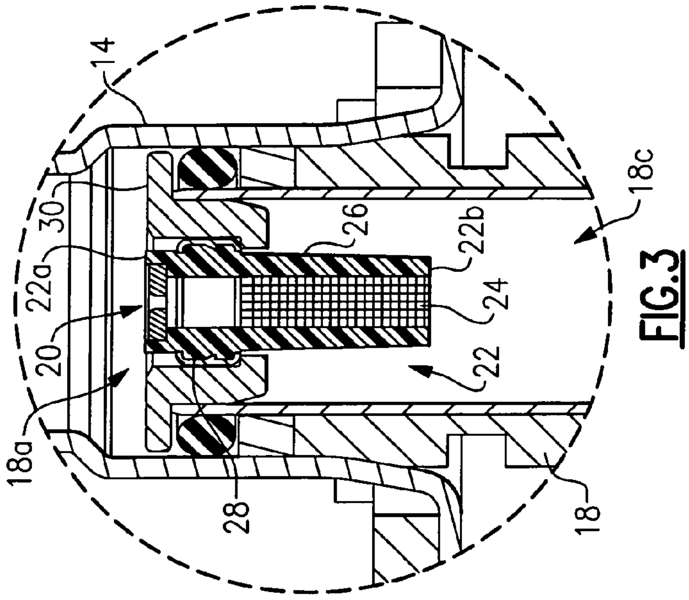
FIG. 3 is an enlarged detail view of the portion of the injector as indicated by the circled dash line labeled FIG. 3 in FIG. 2.

Referring to FIGS. 2 and 3, a preferred embodiment of the invention is shown wherein a restriction orifice 20 is molded or otherwise formed in injector filter 22. Fuel injector filters are known and include a filter media 24 disposed within a filter body 26 for removing small particulate from the fuel as the fuel enters the inlet end 18*a* of the fuel injector 18. The fuel injector filter body 26 may further include ribs 28 or other means for connecting the filter body to the fuel injector directly or via a filter connector 30.

The fuel injector filter is positioned within the longitudinal passageway 18*c* of the injector 18 to intercept and filter the fuel flowing therethrough prior to the fuel exiting the injector at outlet end 18*b*. As seen best in FIG. 3, a restriction orifice 20 is provided at the inlet end 22*a* of filter 22. The restriction orifice may be integrally molded with filter body 26 or may be a separate component which is connected to the filter body 26 adjacent filter inlet end 22*a* or other suitable location within filter body 26. Filter outlet end 22*b* is generally positioned along the longitudinal axis of the injector passage 18*c*.

It is noted that fuel filter bodies are typically injection molded from a plastic such as Nylon 66, for example. In a preferred embodiment, the restriction orifice 20 is between about 0.75 to about 2 mm in diameter although the final size will depend on the particular injector design employed. This restriction orifice is sufficient to substantially reduce or eliminate pressure pulsations in the fuel lines occurring as a result of the opening and closing of the fuel injectors.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. Apparatus for reducing pressure pulsations in a fuel injector comprising:

a) a fuel injector filter located in an inlet end of said fuel injector, said fuel injector filter including a filter media for removing particulates in a fuel passing through said fuel injector filter; and b) a restriction orifice located within said fuel injector filter, wherein said restriction orifice is disposed upstream of said filter media so that all of said fuel passes through said restriction orifice prior to passing through said filter media, and wherein the restriction orifice is between about 0.75 and 2 mm in diameter.

2. The apparatus of claim 1, wherein said fuel injector filter includes a body, wherein said filter media is disposed within said body.

3. The apparatus of claim 2, wherein said restriction orifice is a separate part connected to said body.

4. The apparatus of claim 2 wherein said body and said restriction orifice are integrally formed by injection molding.

5. The apparatus of claim 2, further comprising a filter connector that couples said body of said fuel injector filter with said fuel injector.

6. The apparatus of claim 1 wherein said fuel injector filter has a fuel inlet end and fuel outlet end and wherein said restriction orifice is positioned adjacent said inlet end.

7. The apparatus of claim 1, wherein said fuel injector filter is positioned within a longitudinal passageway of said fuel injector.

8. A method for reducing pressure pulsations in a fuel injector comprising:

a) providing a fuel injector filter located in an inlet end of said fuel injector, said fuel injector filter including a filter media for removing particulates in a fuel passing through said fuel injector filter;

b) providing a restriction orifice located within said fuel injector filter, wherein said restriction orifice is disposed upstream of said filter media so that all of said fuel passes through said restriction orifice prior to passing through said filter media, and wherein the restriction orifice is between about 0.75 and 2 mm in diameter; and c) substantially reducing pressure pulsations by said restriction orifice in said fuel injector that occur as a result of opening and closing said fuel injector.

9. The method of claim 8, wherein said fuel injector filter includes a body, wherein said filter media is disposed within said body.

10. The method of claim 9, wherein said restriction orifice is a separate part connected to said body.

11. The method of claim 9 and further comprising the step of integrally forming by injection molding said body and said restriction orifice.

12. The method of claim 9, wherein said body of said fuel injector filter is connected to said fuel injector using a filter connector.

13. The method of claim 8 wherein said fuel injector filter has a fuel inlet end and fuel outlet end and further comprising the step of positioning said restriction orifice adjacent said inlet end.

14. The method of claim 8, wherein said fuel injector filter is positioned within a longitudinal passageway of said fuel injector.

* * * * *